United States Patent [19]

Reddy

[11] 4,194,765
[45] Mar. 25, 1980

[54] TELESCOPING SLIP-TOGETHER TUBING JOINT

[76] Inventor: Robert R. Reddy, 1195 Michillinda Ave., Pasadena, Calif. 91107

[21] Appl. No.: 885,807

[22] Filed: Mar. 13, 1978

[51] Int. Cl.² .............................................. F16L 47/00
[52] U.S. Cl. ...................................... 285/27; 285/305; 285/331; 285/423
[58] Field of Search .................... 285/27, 24, 305, 388, 285/45 (U.S. only), 423, 331, 345

[56] References Cited

U.S. PATENT DOCUMENTS

| 2,263,655 | 11/1941 | Stettner | 285/388 |
|---|---|---|---|
| 3,133,777 | 5/1964 | Anhalt | 285/305 X |
| 3,305,249 | 2/1967 | Zahauranec | 285/24 |
| 3,394,954 | 7/1968 | Sarns | 285/423 X |
| 3,475,038 | 10/1969 | Matherne | 285/27 |
| 3,604,730 | 9/1971 | Carroll | 285/27 |
| 3,761,601 | 9/1973 | Kaesser et al. | 285/321 X |

FOREIGN PATENT DOCUMENTS

| 2274855 | 1/1976 | France | 285/27 |
|---|---|---|---|
| 941545 | 11/1963 | United Kingdom | 285/305 |

*Primary Examiner*—Thomas F. Callaghan
*Attorney, Agent, or Firm*—Donald D. Mon

[57] ABSTRACT

A telescoping slip-together tubing joinder wherein a first and a second tube slide together, the second sliding over the first. A guide sleeve is mounted to the first tube and projects beyond it to receive and guide the second tube into the telescoping engagement. The guide sleeve is held to the first tube by a retainer which can be attached and removed by external manipulations.

20 Claims, 7 Drawing Figures

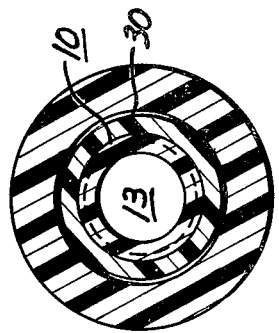
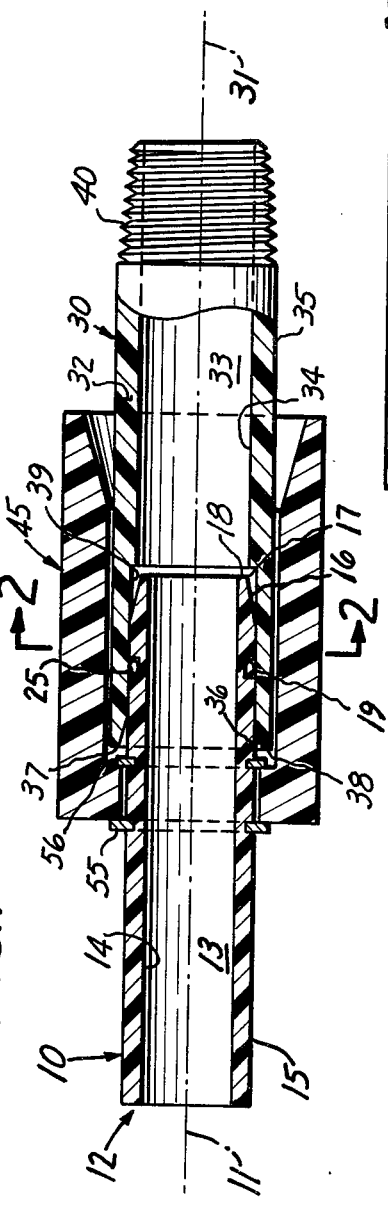
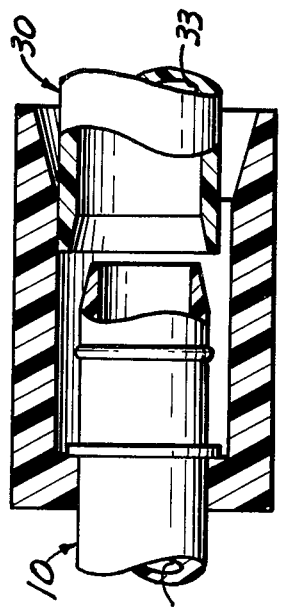
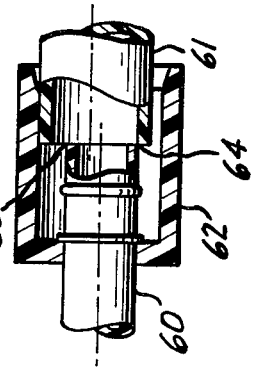
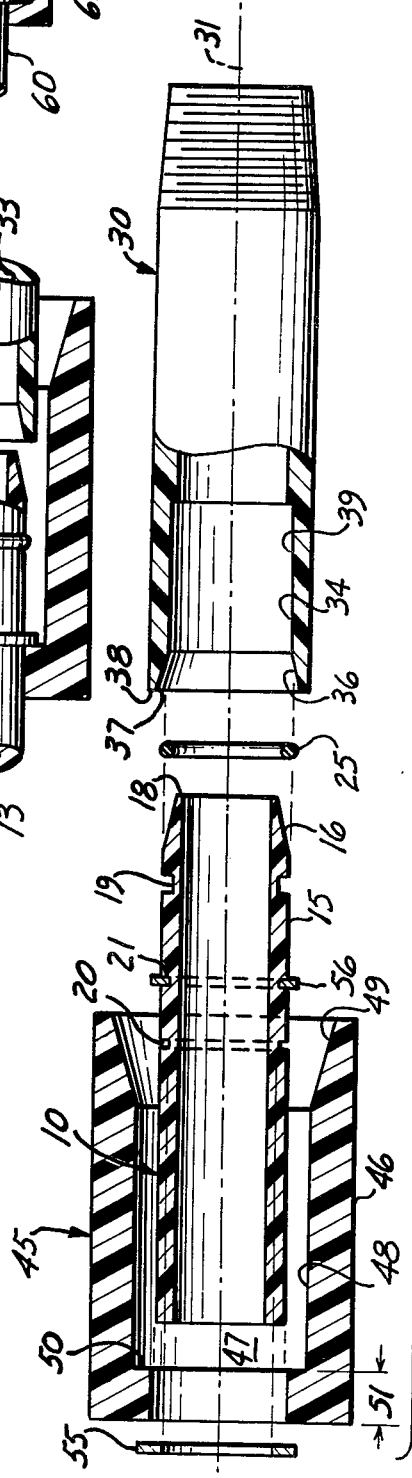

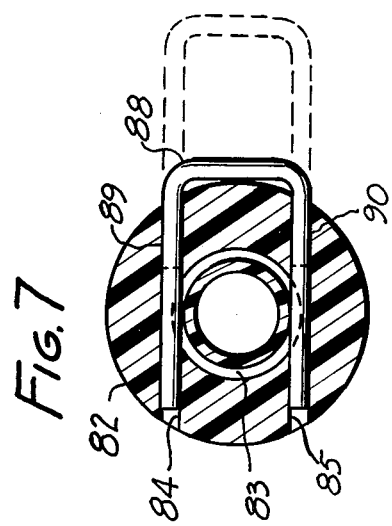
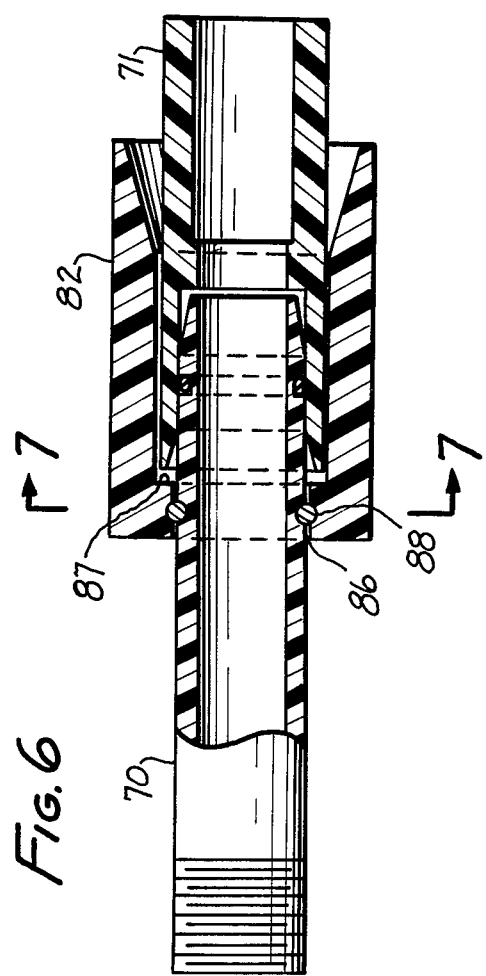

TELESCOPING SLIP-TOGETHER TUBING JOINT

This invention relates to a telescoping slip-together tubing joinder.

There are numerous low pressure fluid systems, especially in drains, where a slip-together tubing joinder is quite satisfactory. Furthermore, in drain systems where ready clean-out is an important objective, this is a preferable form of joinder. Because it must often be completed in secluded or concealed environments it is a very difficult thing to provide. This is especially true in drain lines from hot fat fryers, where it is desirable simply to thrust a drain hose into an outlet, and when the drainage is complete to pull it loose. Naturally it is desirable for such joinders to be leak proof, and also to be capable of ready assembly and simple maintenance. It is an object of this invention to provide a tubing joinder which meets these objectives.

A telescoping slip-together tubing joinder according to this invention includes a first tube and a second tube, each of which has an axis. Each tube has an annular wall defined by a respective inside and outside circularly sectioned concentric surface. Each of these tubes terminates at a joinder end. The diameters of the outside surface of the first tube and the inside surface of the second tube are such that at least a portion of the tubes adjacent to said joinder ends can telescopically overlap one another, the second tubing slipping over the first. Flexible sealing means is carried by one of the two last named surfaces for making a peripheral seal between them. Removable retainer means holds the guide sleeve on the first tube. The retainer means is removable so that the guide sleeve can be removed, enabling the sealing means to be serviced.

The guide sleeve surrounds and projects beyond the joinder end of the first tube so that when the second tube is thrust into the guide sleeve it guides the second tube to a position where its joinder end will slide over the joinder end of the first tube, thereby to facilitate the alignment and joinder of the two tubes.

The invention will be fully understood from the following detailed description and the accompanying drawings, in which:

FIG. 1 is an axial cross-section of an embodiment of the invention in its assembled condition;

FIG. 2 is a cross-section taken at line 2—2 of FIG. 1;

FIG. 3 is an exploded view of the device of FIG. 1;

FIG. 4 is a fragmentary axial section showing a geometrical consideration for the device in FIG. 1;

FIG. 5 is a fragmentary cross-section showing another embodiment of the invention;

FIG. 6 is an axial cross-section of the presently-preferred embodiment of the invention; and FIG. 7 is a cross-section taken at line 7—7 of FIG. 6.

One embodiment of the invention is shown in FIG. 1. This joinder includes a first tube 10 having a central axis 11 and an annular wall 12 forming a central passage 13. The annular wall is defined by an inside surface 14 and an outside surface 15. The outside surface includes a chamfered or tapered section 16 terminating at an interference ring 17 at a joinder end 18. Only the edge of the interference ring shows. It is a circle which is the intersection of the outside surface of the first tube with the joinder end.

A seal groove 19 is peripherally formed in outside surface 15. Two axially spaced apart retainer grooves 20, 21 are formed in the outside surface 15. Seal groove 19 is formed between groove 21 and chamfered section 16.

Peripheral flexible seal means 25 in the form of an O-ring is seated in the seal groove. In its unflexed condition, the ring projects beyond the outside surface of first tube 10 in order to make a peripheral fluid seal which will later be described. Inside surface 14 and outside surface 15 are circularly sectioned, and are concentric with each other around central axis 11.

Second tube 30 has a central axis 31 and an annular wall 32 enclosing a central passage 33. The annular wall is defined by inside surface 34 and outside surface 35. The inside surface has a chamfered or tapered section 36 leading to an interference ring 37 at the joinder end 38 of the second tube. Only the edge of the interference ring shows. It is a circle which is the intersection of the inside surface of the second tube with the joinder end. To receive the end of the first tube, a counter-bore 39 is formed in which the said inside surface 34 is formed. The inside and outside surfaces are concentric with one another around central axis 31. When the first and second tubes are telescopically assembled, axes 11 and 31 are co-linear.

A thread 40 or other attachment means can be provided on the second tube, and for that matter also on the first tube if desired. This provides for connection to next assemblies. Usually the first tube will be part of a permanent installation such as a hot fat fryer, while the second tube will be connected to a rubber hose or some other conduit for carrying away waste liquid.

A guide sleeve 45 is removably attached to and surrounds the first tube, and projects axially beyond its joinder end. The guide sleeve includes a tubular portion 46 which bounds an internal cavity 47. This cavity has a bounding wall 48 with dimensions suitable for the guidance of the second tube. This bounding wall includes an internal chamfer 49 to act as a sort of funnel or guide. The guide sleeve also includes an internal shoulder 50 having a dimension of axial thickness 51 which is no greater than the axial spacing between the retainer grooves.

Two retainer means 55, 56 are provided, each of which is seated in a respective one of the retainer grooves. These retainer means are preferably springy members such as clips or split rings which can be sprung enough to pass over the joinder end of the first tube and then will spring back into a respective retainer groove, where they will project beyond the outside surface of the first tube to abut against the internal shoulder of the guide sleeve. This will hold the guide sleeve in place.

The necessary geometry of the guidance system is shown in FIG. 4. The second tube is shown after having been guided by the chamfer 49 in the guide sleeve. The joinder end of the second tube is shown laterally displaced to the maximum extent possible i.e., bearing against the bounding wall of the guide sleeve. It will be seen that the interference ring of the first tube lies within the interference ring of the second tube. Accordingly, the second tube will slide onto the first tube, with the chamfered sections guiding one another. Thereafter the second tube will slide over the sealing means to make a sealing fit therewith, its chamfered section 36 serving to gradually depress the O-ring into its groove when it passes over it.

In FIG. 5 there is shown a first tube 60, a second tube 61 and a guide sleeve 62, which are identical in all respects to first tube 10, second tube 30, and guide sleeve 45 with the exception that the tubes do not have a chamfered section. In this case the interference ring 63 on the first tube is its outside diameter and the interference ring 64 on the second tube is its inside diameter. The dimensions of the guide sleeve must now be such that when the second tube bears against its bounding wall, the interference ring of the first tube still lies within the interference ring of the second tube. This arrangement will be understood by persons skilled in the art. It will also be recognized that providing either one, or both of the chamfered sections provides a greater range of design flexibility, although they are not necessary to the functioning of the invention.

FIGS. 6 and 7 show the presently preferred embodiment of the invention. It is also the best mode known to the inventor. It differs from the embodiments of FIGS. 1–5 only in its retention means. The retention means of FIGS. 1–5 requires the application of two retainer rings, and the sliding of the guide sleeve to enable both of the retainer rings to be applied by exposing both a retainer groove and the O-ring groove. This requires a substantial unobstructed length of the first tube along which the guide sleeve can slide for this purpose. The construction of FIGS. 6 and 7 can be assembled with a lesser axial displacement, only to expose the O-ring groove.

A first tube 70, a second tube 71, and a guide sleeve 82 are substantially identical to elements 10, 30 and 62 in FIG. 1.

First tube 70 differs only in that instead of having two retainer grooves, it has a single retainer groove 83, and it preferably has a rounded bottom, rather than flat sides.

Guide sleeve 82 differs only in that it has two bores 84, 85 which intersect the passage 86 through its internal shoulder 87. These bores are aligned with retainer groove 83, so that a round-sectioned retainer 88 will fit into the groove, and retain the guide sleeve to the first tube.

Retainer 88 is preferably U-shaped, with two arms 89, 90, each of which passes through a respective one of bores 84, 85.

The assembly is made by axially aligning the bores and grooves 83. Then the retainer is pressed into place. The installed condition is shown in solid line in FIG. 7. To remove the guide sleeve, it is only necessary to pull the retainer out to the dashed line position shown in FIG. 7, where the retainer no longer stands in groove 83.

This type retainer obviously can be used with the construction of FIG. 5, as well as with the construction of FIG. 1.

This invention provides considerable elegance of maintenance and assembly. Obviously the telescopic assembly of the tubes is a simple and straight forward matter which can be done "blind" with ease. All that is necessary is for the end of the second tube to reach the chamfered portion of the guide sleeve and from there it cannot help but work.

It will be noted that the guide sleeve surrounds and protects the sealing means when it is not covered by the second tube. This is an advantage in protecting it from accidental damage or injury. In order to assemble the construction in the first place, or to remove and replace the ring, it is necessary to have access to the ring groove. For this purpose, in FIGS. 1–5 retainer means 55 can be removed and the guide sleeve slid to the left to expose not only the seal means but also the second retainer means 56. In FIGS. 6–7, the retainer is pulled to the dashed line position shown in FIG. 7. Obviously, the ring can now be installed, or removed and replaced. Were the device being assembled for the first time, the guide sleeve would first be placed on the first tube without any retainer means at all and in the embodiment of FIGS. 1–5 would be slid to the left in FIG. 1 to expose the retainer groove 21 and the ring groove. Retainer 56 and the ring would both be put in place and then the guide sleeve would be slid to the right until it bears against retainer means 56. Then retainer means 55 would be put in place. In FIGS. 6–7, the guide sleeve would be slid only far enough to expose the O-ring groove. After it is installed, the guide sleeve would be slid to the position where the retainer can engage the retainer groove. It will be seen that these are both elegantly simple means of assembly, disassembly, and servicing of a tubing joint which enables ready assembly in a blind manner.

The operation and servicing of the device of FIG. 5 is identical to that of FIG. 1.

It is evident that the sealing means could be placed inside the second tube, but this would lack the simplicity and ease of servicing provided by the illustrated device.

This invention is not to be limited by the embodiments shown in the drawings and described in the description which are given by way of example and not of limitation, but only in accordance with the scope of the appended claims.

I claim:

1. A telescoping slip-together tubing joinder comprising:

a first tube and a second tube each having an axis, each tube comprising an annular wall defined by a respective inside and outside circularly-sectioned concentric surface, each said tube terminating at a joinder end; the diameters of the outside surface of the first tube and the inside surface of the second tube being such that at least a portion of said tubes adjacent to said joinder ends can telescopically overlap one another; flexible seal means carried by and extending laterally beyond one of said two last named surfaces by a distance sufficient to make a peripheral seal between them when the said surfaces are sufficiently axially overlapped and being sufficiently deformable as to enable said sufficient axial overlap to occur; a guide sleeve having an inside cavity defined by a continuous, fully peripheral and unitary guide wall; and a removable retainer means engageable between said guide sleeve and said first tube to hold said guide sleeve to first tube with said guide wall projecting beyond said joinder end of said first tube, and preventing substantial axial movement of said guide sleeve when engaging the said guide sleeve to said first tube, the lateral dimensions of said guide wall, and of said outside surfaces of said first tube and said inside surface of said second tube at their joinder ends being so proportioned that, with the outside surface of second tube bearing against said guide wall, the interference circle of the first tube lies inside the interference circle of the second tube, whereby an axially telescoping thrust on the two tubes will result in the joinder end of the second tube passing axially over the joinder end of the first tube regardless of any permissible lateral offset of the axes of the tubes.

2. A tubing joinder according to claim 1 in which at least one retainer groove is formed in said outside surface of said first tube, and in which said retainer means is engageable in said retainer groove whereby to restrain the guide sleeve against axial movement in at least one direction.

3. A tubing joinder according to claim 2 in which said retainer means comprises resilient means stretchable to reach said retainer groove, and which resiliently returns to fit in said groove.

4. A tubing joinder according to claim 3 in which said resilient means is snap rings.

5. A tubing joinder according to claim 2 in which there are two of said retainer grooves and two of said retainer means, axially spread apart so as to embrace between them an internal shoulder on said guide sleeve.

6. A tubing joinder according to claim 2 in which the guide means is pierced by at least one bore which intersects said retainer groove, and in which said retainer means fits in said bore and in said retainer groove.

7. A tubing joinder according to claim 6 in which there are two of said bores, and in which said retainer means comprises a U-shaped body entering both of said bores.

8. A tubing joinder according to claim 1 in which said seal means comprises a pheripheral deformable ring seated in a ring groove in one of the surfaces between which it makes its seal.

9. A tubing joinder according to claim 8 in which the ring groove is formed in the outside surface of the first tube.

10. A tubing joinder according to claim 1 in which the end of the guide sleeve which projects beyond the joinder end of the first tube is internally chamfered whereby to guide the end of the second tube into the guide sleeve.

11. A tubing joinder according to claim 1 in which the inside surface of the second tube adjacent to its joinder end includes a chamfered section.

12. A tubing joinder according to claim 1 in which the outside surface of the first tube adjacent to its joinder end includes a chamfered section.

13. A tubing joinder according to claim 12 in which the inside surface of the second tube adjacent to its joinder end includes a chamfered section.

14. A tubing joinder according to claim 2 in which said seal means comprises a peripheral deformable ring seated in a ring groove in one of the surfaces between which it makes its seal.

15. A tubing joinder according to claim 14 in which the ring groove is formed in the outside surface of the first tube.

16. A tubing joinder according to claim 15 in which the end of the guide sleeve which projects beyond the joinder end of the first tube is internally chamfered whereby to guide the end of the second tube into the guide sleeve.

17. A tubing joinder according to claim 16 in which the inside surface of the second tube adjacent to its joinder end includes a chamfered section.

18. A tubing joinder according to claim 16 in which the outside surface of the first tube adjacent to its joinder end includes a chamfered section.

19. A tubing joinder according to claim 18 in which the inside surface of the second tube adjacent to its joinder end includes a chamfered section.

20. A tubing joinder according to claim 1 in which the guide wall is an inside circularly sectioned surface whose diameter is sufficiently greater than the diameter of the outside surface on the second tube that there is a substantial clearance between them.

* * * * *